United States Patent [19]

Clark et al.

[11] 4,325,568
[45] Apr. 20, 1982

[54] MODULAR OCCUPANT RESTRAINT SYSTEM

[75] Inventors: Herbert D. Clark, Kettering; Larry L. Katz, Dayton; Thomas L. Knoepfle, Kettering, all of Ohio

[73] Assignee: General Motors Corporation, Detroit, Mich.

[21] Appl. No.: 172,516

[22] Filed: Jul. 28, 1980

[51] Int. Cl.³ .............................................. B60R 21/08
[52] U.S. Cl. ................................ 280/731; 74/484 H; 200/61.55
[58] Field of Search ............................ 280/731, 728; 200/61.55, 61.56, 61.57, 61.54; 74/484 R, 484 H

[56] References Cited

U.S. PATENT DOCUMENTS

| | | | |
|---|---|---|---|
| 3,517,145 | 6/1970 | Wallace | 200/61.55 |
| 3,619,525 | 11/1971 | Sjoberg, Jr. | 200/61.55 |
| 3,819,205 | 6/1974 | Dunford et al. | 280/731 |
| 3,838,236 | 9/1974 | Wolf et al. | 200/61.57 X |
| 3,895,823 | 7/1975 | Stephenson | 280/731 |
| 3,985,076 | 10/1976 | Schneiter et al. | 280/741 X |
| 4,148,503 | 4/1979 | Shiratori et al. | 280/731 |

FOREIGN PATENT DOCUMENTS 1947620 4/1970 Fed. Rep. of Germany ... 200/61.54

Primary Examiner—Joseph F. Peters, Jr.
Assistant Examiner—Milton L. Smith
Attorney, Agent, or Firm—Herbert Furman

[57] ABSTRACT

A modular occupant restraint system includes an inflator, a cushion, a container for the cushion, and a cover for the container assembled as a module to a support plate which is releasably mounted on a vehicle steering wheel. The support plate includes pairs of arms extending laterally to opposite edges thereof and a horn blowing switch which is releasably pivotally connected to one arm and releasably secured to the other arm, with the switch being exposed for repair or replacement without disassembly of any of the components of the system. The container includes spaced pairs of arms which engage respective support plate arms and support spoke extensions of the cover which enclose the container arms and support plate arms. The spoke extensions mount horn buttons which close the switch.

4 Claims, 13 Drawing Figures

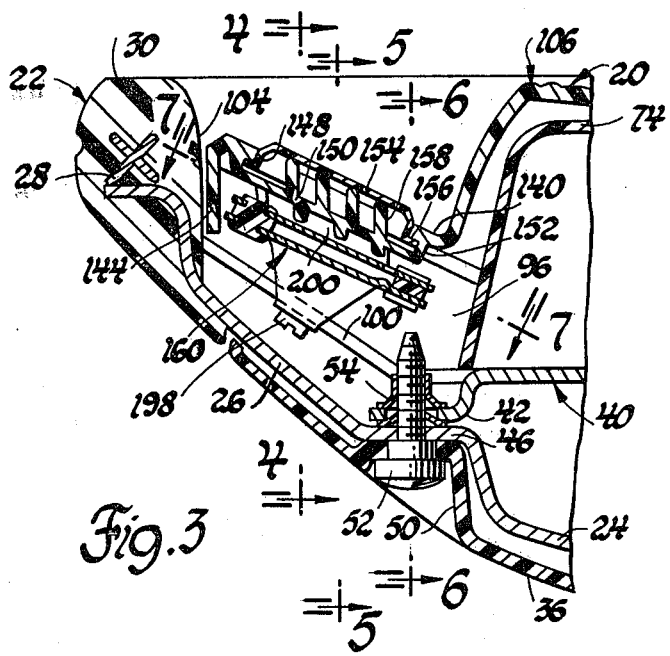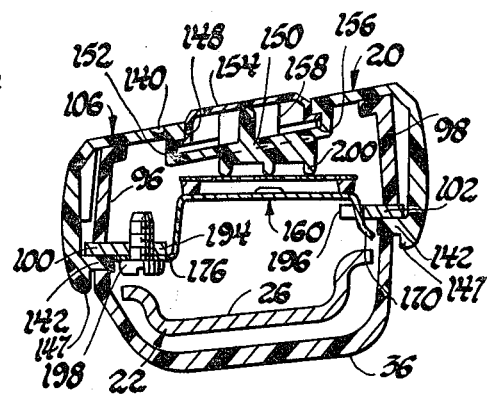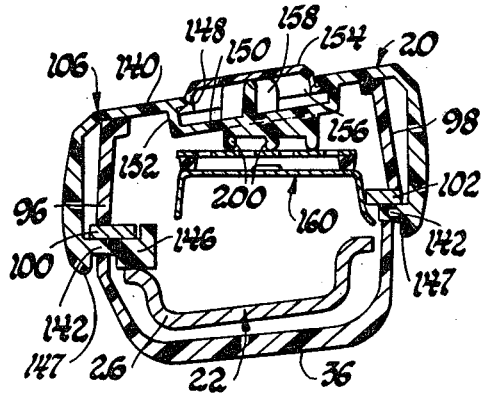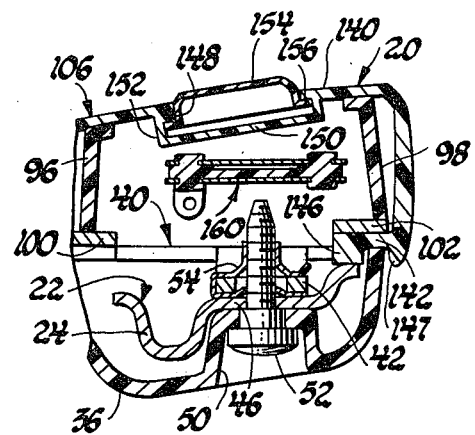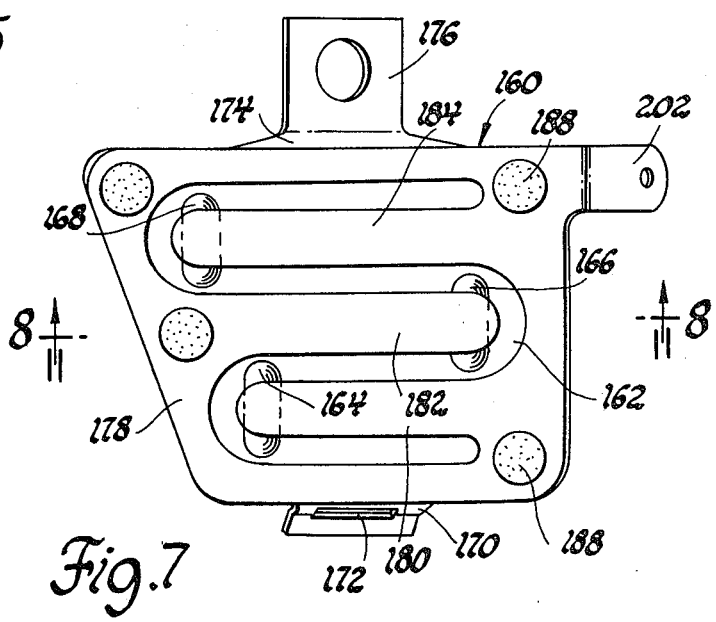

MODULAR OCCUPANT RESTRAINT SYSTEM

FIELD OF THE INVENTION

This invention relates generally to modular occupant restraint systems and more particularly to a modular occupant restraint system having a horn blowing switch arrangement.

SUMMARY OF THE INVENTION

Modular occupant restraint systems are known. Dunford et al U.S. Pat. No. 3,819,205, Modular Occupant Restraint System, discloses such a system wherein an inflator, an inflatable cushion, a container for the cushion, and a cover for the container and cushion, are all assembled to a support plate to provide a restraint system module for a vehicle steering wheel. The module includes a horn blowing switch arrangement which is housed within the container for the cushion. If access is necessary to the switch for repair or replacement, the cover and the container must both be disassembled from the support plate before the switch is exposed.

The system of this invention is of the modular type and includes an inflator, a cushion, a container for the cushion and a cover for the container and cushion, which are all assembled to a support plate to provide a module which is assembled to and disassembled from the vehicle steering wheel. However, the system of this invention includes an improved horn blowing switch arrangement which includes a switch exposed for repair or replacement without disassembly of any of the components of the module.

In the preferred embodiment of the invention, the support plate is provided with a pair of spaced arms which extends laterally from each of the opposite side edges thereof. The arms are angled with respect to each other and the support plate so as to generally follow the contour of a respective spoke portion of the steering wheel. The switch arrangement includes a pressure responsive switch which spans each pair of arms of the support plate and is removably secured thereto. The switch includes a lower contact plate and an upper contact plate having individually depressable integral fingers which are movable through an intermediate spacer into engagement with respective contacts of the lower plate to close the horn blowing contact. The contact plates are secured to the spacer by heat staked tabs thereof. The lower plate includes a first slotted tab which receives a first tab on one arm of the support plate and a second apertured tab which engages the underside of a respective second apertured tab on the other arm of the support plate and is secured thereto by a fastener. After the slotted tab is fitted over the first tab of the one support arm, the switch can be swung relative to the first tab to engage and align the apertured tab of the switch with the second tab of the other support arm for securement thereto. The cover of the module is provided with integral spoke extensions each supported by a pair of integral arms of the container which seat on the support plate arms. Each extension encloses a respective pair of container arms and support plate arms, except for the tabs thereof, but leaves the switch exposed from the underside of the support plate arms. Each extension includes an opening therethrough and an integral flexible wall supported below the opening by an intermediate flange. A flanged horn button has the body thereof fitting within the opening and the flange thereof engaged with the underside of the extension around the opening by integral ribs which extend upwardly from the wall and engage within the button. The wall further includes integral ribs which extend downwardly therefrom in alignment with the contact fingers for closing one or more such fingers to a respective contact when a horn button is finger depressed.

The primary feature of this invention is that is provides a modular occupant restraint system having a horn blowing switch arrangement which is exposed for service without disassembly of any of the components of the system. Another feature of this invention is that the arrangement includes a switch spanning spaced arms of the support plate of the module and actuated by a horn button through an integral wall of a spoke extension of the cover of the module. A further feature of this invention is that the switch is removably mounted to the arms by an interfitting pivotal arrangement between the switch and one of the arms and a removable fastener between the switch and the other arm. Yet another feature of this invention is that the integral wall of the spoke extension supports a horn button within an opening of the extension and also actuates the switch when the button is depressed.

BRIEF DESCRIPTION OF THE DRAWINGS

These and other features of the invention will be readily apparent from the following description and drawings wherein:

FIG. 3 is an enlarged view of a portion of FIG. 2;

FIG. 4 is a sectional view taken generally along the plane indicated by line 4—4 of FIG. 3;

FIG. 5 is a sectional view taken generally along the plane indicated by line 5—5 of FIG. 3;

FIG. 6 is a sectional view taken generally along the plane indicated by line 6—6 of FIG. 3;

FIG. 7 is an enlarged top plan view of the horn blowing switch;

Referring now to FIG. 1 of the drawings, a modular occupant restraint system designated generally 20 is shown mounted on a vehicle steering wheel 22. As shown in FIGS. 2, 11, 12 and 13, the steering wheel 22 includes a hub portion 24 of generally rectangular dish shape and a pair of integral spokes 26 which extend laterally from the sides of the hub portion and are joined at their outer ends to a cruciform shape ring 28. The outer portions of the spokes 26 and the ring 28 covered with molded plastic material which provides the rim 30 of the steering wheel. The hub portion 24 includes a central opening 32 surrounded by a splined bushing 34 which receives the upper splined end of the steering shaft, not shown, so as to secure the steering wheel thereto. The steering wheel is secured to the shaft by a nut in a conventional manner.

Figure 1:
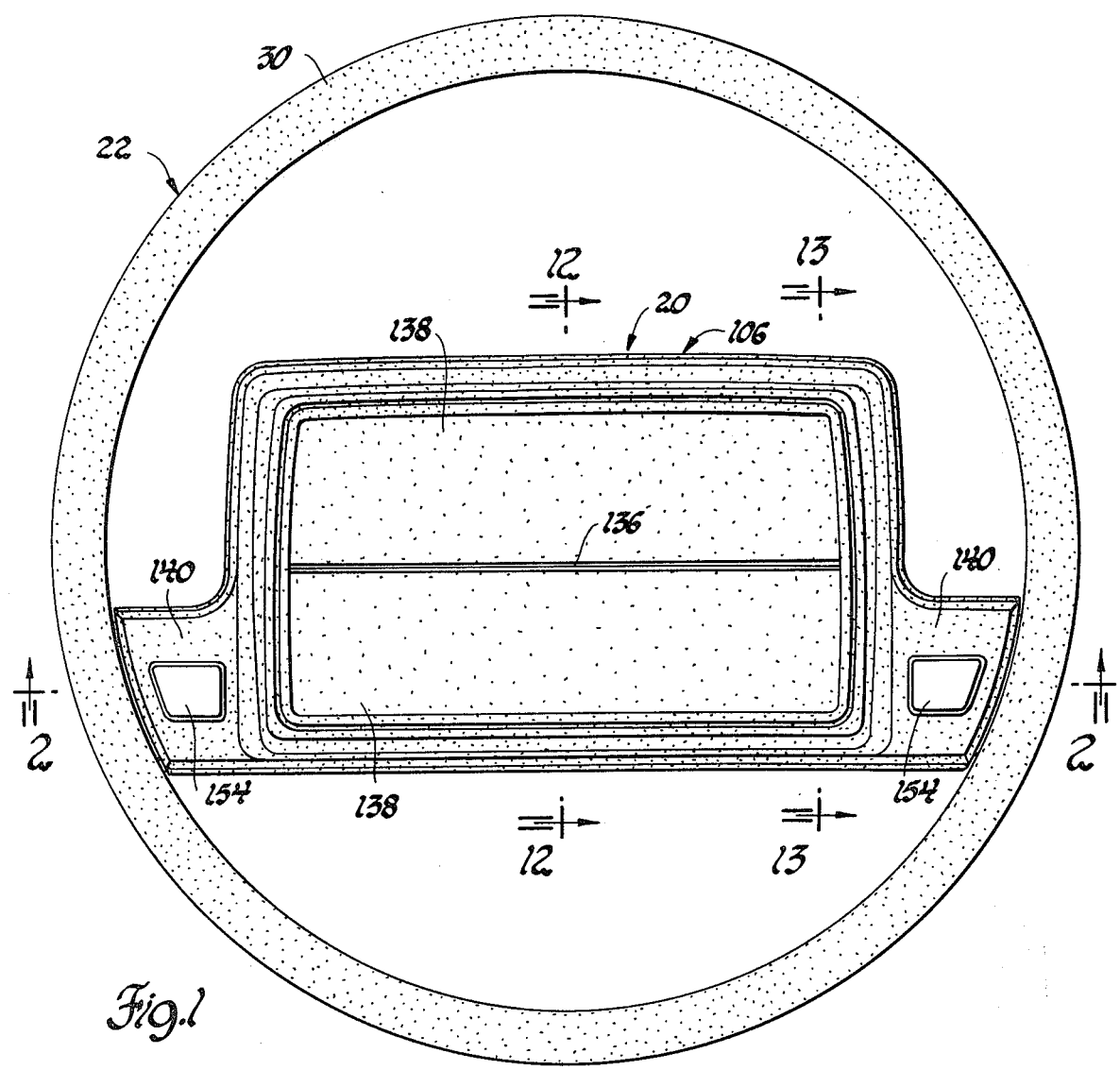
FIG. 1 is a front elevational view of a modular component restraint system according to this invention mounted on a vehicle steering wheel.

A plastic shroud 36 has a body portion of generally rectangular dish shape covering the hub portion 24 and a pair of integral dish shape extensions covering the spokes 26. The shroud includes a generally circular depending skirt or flange 38 which surrounds the bushing 34 and aligns with the upper edge portion of the steering column in a conventional manner.

Figure 9:
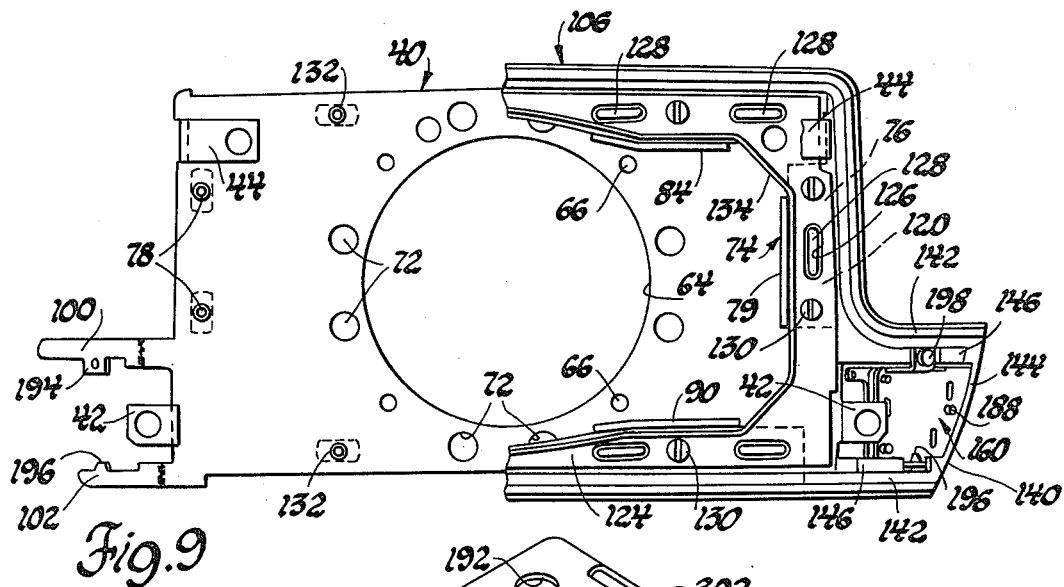
FIG. 9 is a view taken generally along the plane indicated by line 9—9 of FIG. 2 with parts omitted for clarity.
Figure 11:
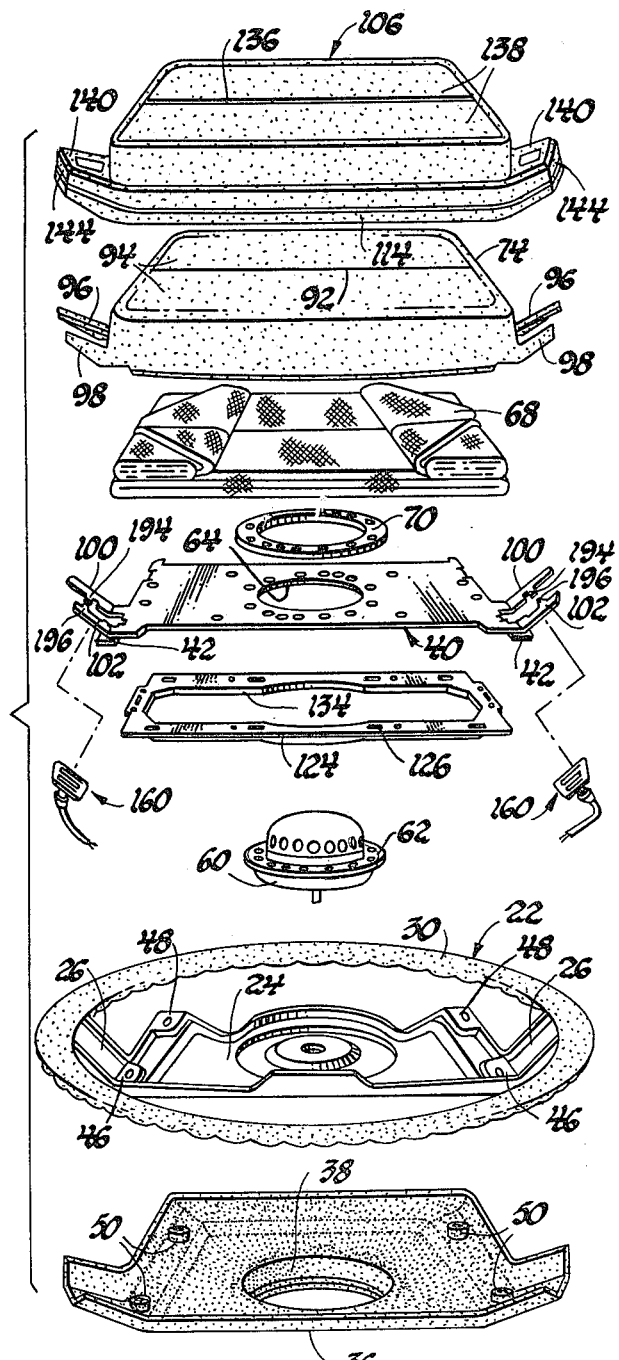
FIG. 11 is an exploded perspective view of FIG. 1.

The occupant restraint system 20 includes a generally rectangular shape support plate 40 which is generally coextensive with the hub portion 24 of the steering wheel. Plate 40 includes a pair of downwardly offset apertured tabs 42, FIG. 9, projecting laterally therefrom, and a pair of downwardly offset apertured tabs 44 which overlie the plate. As shown in FIG. 11, the spokes 26 include apertured upwardly offset flats 46 and the hub portion includes upwardly offset apertured flats 48 at the upper corners thereof. The apertured tabs 42 of the support plate 40 seat on the upper surfaces of offsets 46, FIG. 2, and the apertured tabs 44 seat on the upper surfaces of offsets 48, FIG. 13, to thereby seat the restraint system 20 on the steering wheel.

Figure 13:
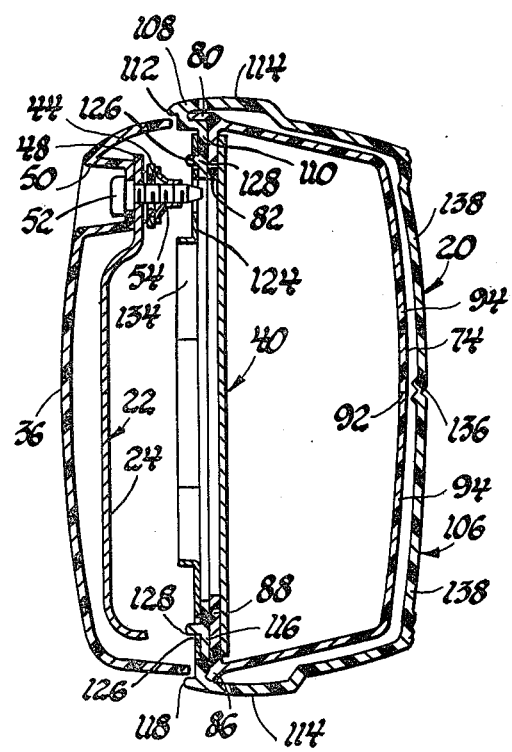
FIG. 13 is a sectional view taken generally along the plane indicated by line 13—13 of FIG. 1.

As shown in FIGS. 3, 11 and 13, the shroud 36 includes four apertured integral embossments 50 which seat against the lower surfaces of the offsets 46 and 48. Suitable screws 52 extend through the apertures of the embossments and offsets and into fasteners 54 on tabs 42 and 44 to removably secure the shroud and support plate to the steering wheel.

Figure 2:
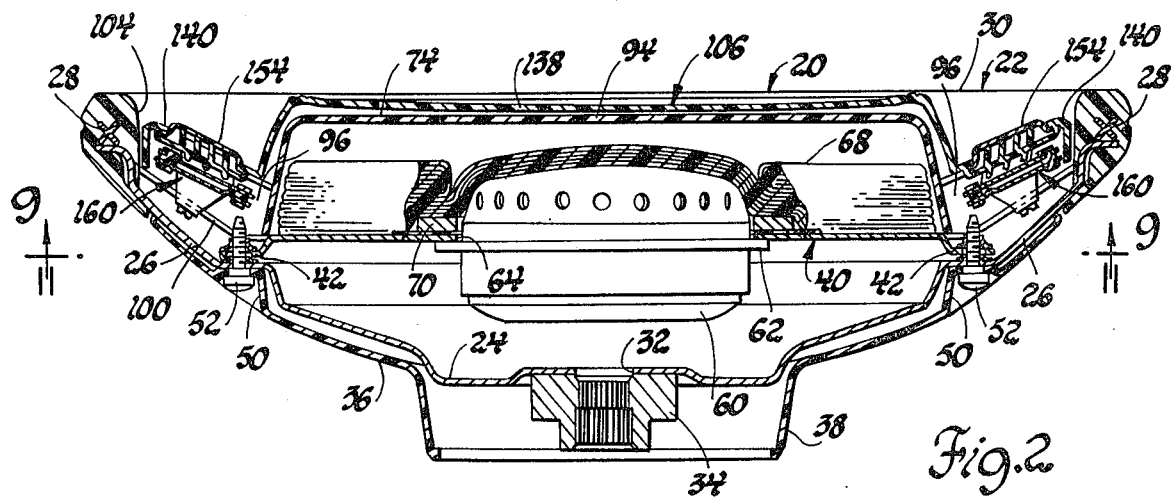
FIG. 2 is a sectional view taken generally along the plane indicated by line 2—2 of FIG. 1.
Figure 12:
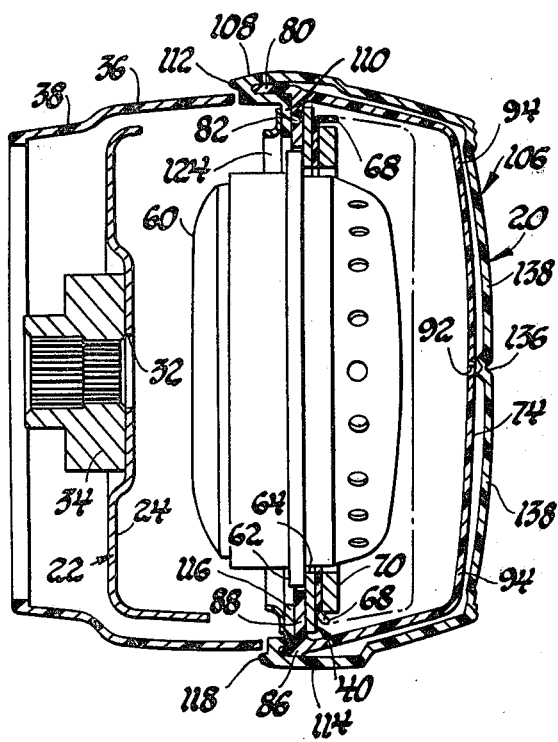
FIG. 12 is a sectional view taken generally along the plane indicated by line 12—12 of FIG. 1.

The various components of the modular occupant restraint system 20 are mounted to the support plate 40. As shown in FIGS. 2 and 12, an inflator 60 includes a circular flange 62 which seats against the lower surface of the support plate 40 adjacent a circular opening 64 therein. Flange 62 is secured to plate 40 by bolts, not shown, extending through apertures 66 of the support plate as will be further described. The inflator 60 is a gas generator which is electrically actuated from a conventional power source by acceleration and/or velocity responsive sensors actuated by impact of the vehicle with an obstacle or the possibility or probability of such an impact. The sensors, as well as the control circuits for the sensors and the inflator, are known and are therefore not shown. The inflator forms no part of this invention and reference may be had to Schneiter et al, U.S. Pat. No. 3,985,076, for further details.

The upper outlet portion of the inflator projects upwardly through the opening 64 of the support plate and into the interior of a folded occupant restraint cushion 68. The cushion generally comprises upper and lower circular walls of suitable coated fabric material, such as Dacron, which are secured together at their periphery. The lower wall of the cushion is provided with a central circular aperture for receipt of the upper outlet portion of the inflator. The lower wall around the opening therein seats on the upper surface of the support plate 40 around the opening 64 and is secured thereto by a retainer ring 70 provided with a series of tapped openings to receive the bolts which project through apertures 66 and additional apertures 72 in the support plate. The cushion is folded so as to lie within the confines of the support plate 40.

A container 74 for the cushion 68 is formed of rigid molded plastic and is of generally rectangular dished shape as shown in FIG. 11. The container overlies the folded cushion. Each side edge of the container includes a laterally inwardly extending apertured flange 76, FIG. 9, which projects inwardly and seats against the lower surface of the plate 40. The flange apertures receive tapped T-nuts 78 secured to the upper surface of the plate 40 and depending therefrom. Each flange 76 terminates in a lateral terminal flange 79. The upper edge of the container 74 includes a depending slightly offset arcuate flange 80 which has its maximum depth at the midpoint thereof and a lesser depth at the ends thereof as can be seen from a comparison of FIGS. 12 and 13. A flange 82 extends laterally inwardly from the flange 80 and seats against the lower surface of the plate 40. Flange 82 includes two spaced terminal flanges 84, FIG. 9. The lower edge of the container 74 likewise includes a depending slightly offset arcuate flange 86, shallower than the flange 80 at the midpoint thereof and which likewise has a lesser depth at the ends thereof, as can be seen from a comparison of FIGS. 12 and 13. A lateral flange 88 extends inwardly from the flange 86 and seats against the lower surface of plate 40. Spaced lateral flanges 90, FIG. 9, depend from the flange 88. The upper wall of container 74 is provided with a split line 92, FIG. 11, to generally divide this wall into two separable flaps 94 which can open outwardly and oppositely of each other.

The container further includes spaced pairs of vertically disposed flange arms 96 and 98 which extend from the side walls thereof and seat edgewise on respective pairs of cantilevered arms 100 and 102 of the support plate 40. The arms 100 are longer than the arms 102 and are slightly offset vertically upwardly therefrom as shown in FIG. 11. Each pair of arms 100 and 102 overlie a respective spoke portion 26 of the steering wheel 22 and the outer ends thereof fit closely adjacent the inner surface 104 of the rim 30 of the steering wheel as shown in FIG. 3.

An outer decorative cover 106 of rectangular dished shape overlies the container 74. The cover 106 is formed of flexible molded plastic. The upper edge of the container includes an offset U-shape cross section edge portion 108 which is longitudinally arcuate and receives the arcuate flange 80 of the container 74 therein to interlock the upper edges of the container and cover. The edge portion includes a lateral flange 110 which seats against the flange 82 of the container, FIGS. 12 and 13 and a terminal flange 112 which overlaps the shroud. The lower edge of the cover likewise includes a U-shape cross section edge portion 114 which is longitudinally arcuate and receives the arcuate flange 86 of the container 74 to interlock the lower edges of the container and cover. Edge portion 114 includes a lateral flange 116 which seats against the flange 88 of the container and a terminal flange 118 which overlaps the shroud. The opposite side edges of the cover include lateral flanges 120 which are coextensive with and overlie the flanges 76 of the container.

A cover retainer 124 of sheet metal overlies the flanges 110, 116 and 120 of the cover 106 and includes a series of closed elongated slots 126 which receive integral depending extensions 128 of these various flanges to interlock the retainer 124 and the cover. Bolts 130 extend through aligned apertures in the retainer, the flanges 110, 116 and 120 of the cover, and respective flanges 82, 88 and 76 of the container, and into the T-nuts 78 and similar T-nuts 132 to clamp and secure the retainer and the respective flanges to the support plate 40. The inner periphery of the retainer has a continuous lateral flange 134 for strength and also to interlock with flanges 79, 84, and 90. The cover 106 is suitably scored at 136 in general alignment with the split line 92 of the container so as to provide flaps 138 similar to the flaps 94 of the container.

From the foregoing description, it can be seen that the inflator 60, the cushion 68, the container 74 for the cushion, and the cover 106 for the container, are all secured to the support plate 40 so as to provide a modular restraint system which can be assembled as a unit to the steering wheel 22 or disassembled therefrom.

The cover 106 further includes a pair of integral extensions 140 which overlie and seat on the upper flanges of a respective pair of arms 96 and 98 of the container 74, FIGS. 4–6. The extensions 140 enclose the arms 96 and 98 and the upper and lower walls thereof terminate in lateral flanges 142 which underlie the arms 100 and 102 of the support plate. The upper and lower walls are interconnected by an end wall 144 which is located adjacent the surface 104 of rim 30. The flanges 142 each include a rib 146 which seats on the spoke portions 26 of the steering wheel and a terminal flange 147 which overlies the shroud 36. The ribs 146 are clamped between the arms 100 and 102 of the support plate and the spoke portions 26 to thereby prevent the extensions from pulling out from underneath the arms of the support plate.

Each of the extensions 140 includes a generally rectangularly shaped opening 148 which leads to a flexible inset or recessed wall 150 integrally joined to the extension by a flange 152. A finger depressable horn button 154 fits within each opening 148 and includes a lateral flange 156 which seats against the under surface of the extension 140 under the resilient biasing force of a series of lateral and longitudinally interconnected integral ribs 158 which project upwardly from the wall 150.

Figure 8:
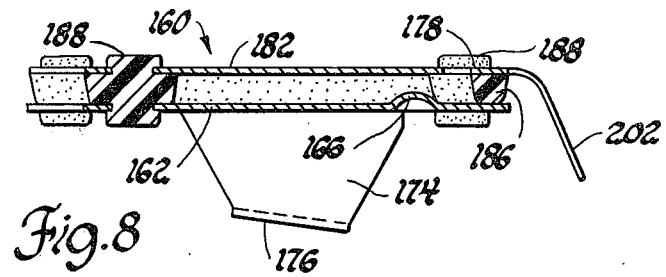
FIG. 8 is a sectional view taken generally along the plane indicated by line 8—8 of FIG. 7.
Figure 10:
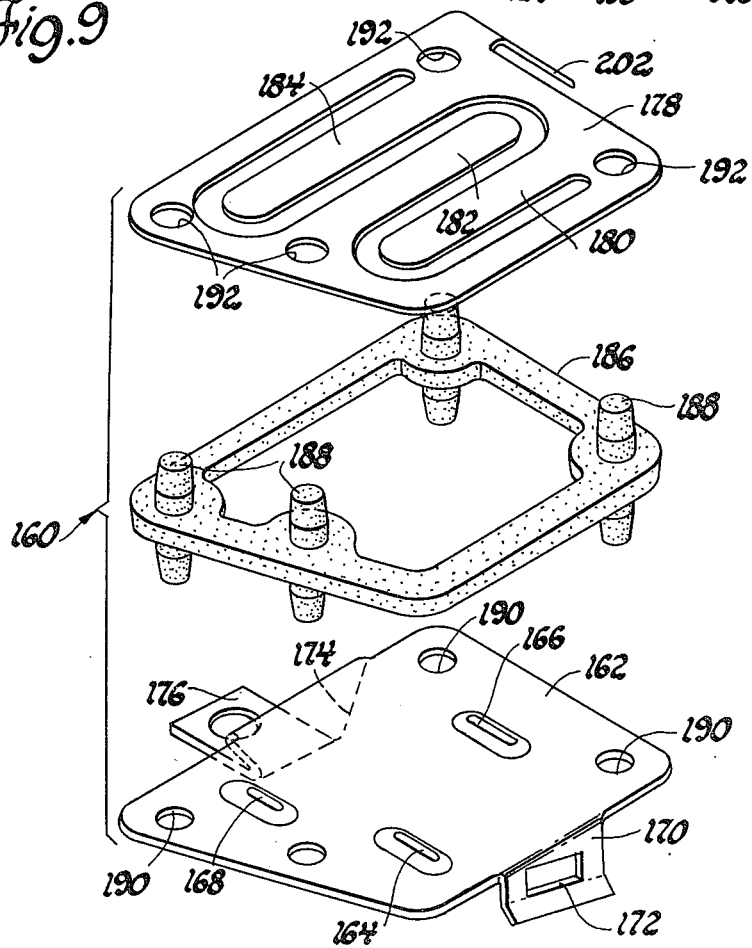
FIG. 10 is an exploded perspective view of the switch of FIG. 7.

As shown in FIGS. 7, 8 and 10, a horn blowing switch 160 includes a lower metal contact plate 162 provided with three upwardly extending integral contacts or ribs 164, 166, and 168. A depending offset tab 170 of plate 162 is provided with a generally rectangularly shaped aperture 172 and a depending flange 174 from an opposite edge of the plate 162 is provided with an apertured lateral tab 176. The upper metal contact plate 178 of the switch is provided with a closed sinuous integral slot which provides a series of integral individual cantilevered contact fingers 180, 182 and 184. A plastic spacer 186 fits between the edge portions of the plates 162 and 178 and includes a series of integral posts 188 which project to opposite sides thereof and are received within respective aligned openings 190 and 192 of the plates 162 and 178 respectively. The posts 188 are heat staked over the plates to secure the plates to the spacer and locate the fingers 180, 182 and 184 in spaced relationship to their respective ribs 164, 166 and 168.

A switch 160 spans each pair of arms 100 and 102 of the support plate and is releasably mounted on the arms. The arm 100 is provided with an integral apertured tab 194 and the arm 102 is provided with an integral tapered tab 196, FIG. 9. The tab 196 receives the aperture 172 of the tab 170 of the switch 160 to pivotally connect the switch to the plate 40 for swinging movement away from the plate and toward the plate so as to engage tab 176 of the switch with the tab 194, as best shown in FIG. 4. A threaded fastener 198 secures the tabs 176 and 194 to each other to secure the switch to the support plate arms. The flange 142 and rib 146 are cut away, FIG. 9, to provide space for tab 170 and the fastener 198 and access thereto.

As shown in FIGS. 3 through 6, the wall 150 has a series of cross-connected integral ribs 200 which depend downwardly therefrom in alignment with respective fingers 180, 182 and 184. If a horn button 154 is depressed, the wall 150 will flex and engage one or more of the ribs 200 with respective fingers 180, 182 and 184 and close such fingers through the spacer 186 into engagement with the respective contact ribs 164, 166 or 168 of plate 162 to thereby complete an electrical circuit from a battery conductor, not shown, connected to tab 202 of plate 178, to ground across the support plate 40 and the vehicle steering column, not shown.

If access is necessary to a switch 160, all that is necessary is that the bolts 52 be removed to permit the modular system 20 to be disassembled from the steering wheel. Thereafter removal of a fastener 198 permits the easy disassembly of the switch from the support plate for repair or replacement.

Should the inflator 60 be electrically actuated, the gas from the inflator will fill and inflate the cushion 68. As the cushion 68 fills, it will separate the upper wall of container 74 along the split line 92 into the flaps 94 and likewise separate the upper wall of the cover along the score line 136 into the flaps 138 to thereby permit release of the inflated cushion from the module to a position overlying the module and the steering wheel 22 for engagement by the driver of the vehicle.

Thus this invention provides an improved modular occupant restraint system.

The embodiments of the invention in which an exclusive property or privilege is claimed are defined as follows:

1. In combination with a vehicle steering wheel including a hub portion and at least one spoke portion connecting the hub portion to a rim portion, a modular occupant restraint system including a support member overlying the hub portion and including spaced arms overlying the spoke portion, a container for an occupant restraint cushion over the support member and including spaced extensions, each overlying and respective to a support member arm, a cover overlying the container and including an extension portion overlying and covering the container extensions and underlying the support member arms while leaving the space between the arms open to permit access to such space, switch means located in the space between the support member arms, means removably securing the switch means to the arms, and manually depressable means on the cover extension engageable with the switch means through the container extensions.

2. In combination with a vehicle steering wheel including a hub portion and at least one spoke portion connecting the hub portion to a rim portion, a modular occupant restraint system including a support member overlying the hub portion and including spaced arms overlying the spoke portion, a container for an occupant restraint cushion over the support member and including spaced extensions, each overlying and respective to a support member arm, a cover overlying the container and including an extension portion overlying and covering the container extensions and underlying the support member arms while leaving the space between the arms open to permit access to such space, switch means located in the space between the support member arms, interfitting pivot means removably securing the switch means to one of the arms, removable fastening means removably securing the switch means to the other of the arms, and manually depressable means on the cover extension engageable with the switch means through the container extensions.

3. In combination with a vehicle steering wheel including a hub portion and at least one spoke portion connecting the hub portion to a rim portion, a modular occupant restraint system including a support member overlying the hub portion and including spaced arms overlying the spoke portion, a container for an occupant restraint cushion over the support member and including spaced extensions, each overlying and respective to a support member arm, a cover overlying the container and including an extension portion overlying and covering the container extensions and underlying the support member arms while leaving the space between the arms open to permit access to such space, switch means located in the space between the support member arms, means removably securing the switch means to the arms, wall means on the cover extension overlying the switch means and underlying an opening therethrough, and manually depressable button means supported within the opening by the wall means, the wall means being engageable with the switch means upon depression of the button means.

4. In combination with a vehicle steering wheel including a hub portion and at least one spoke portion connecting the hub portion to a rim portion, a modular occupant restraint system including a support member overlying the hub portion and including spaced arms overlying the spoke portion, a container for an occupant restraint cushion over the support member and including spaced extensions, each overlying and respective to a support member arm, a cover overlying the container and including an extension portion overlying and covering the container extensions and underlying the support member arms while leaving the space between the arms open to permit access to such space, switch means, interfitting pivot means removably securing the switch means to one of the arms, removable fastening means removably securing the switch means to the other of the arms to locate the switch means in the space between the support member arms, a flexible wall on the cover extension underlying an opening therethrough and overlying the switch means, button means supported within the opening by rib means extending upwardly of the wall, and additional rib means extending downwardly of the wall and engageable with the switch means upon flexure of the wall by the button means through the rib means.

* * * * *